United States Patent [19]

Alofs et al.

[11] Patent Number: 5,467,084
[45] Date of Patent: Nov. 14, 1995

[54] VEHICLE POSITION DETERMINING APPARATUS

[75] Inventors: Cornell W. Alofs; Ronald R. Drenth, both of Petoskey, Mich.

[73] Assignee: Jervis B. Webb Company, Farmington Hills, Mich.

[21] Appl. No.: 218,716

[22] Filed: Mar. 28, 1994

[51] Int. Cl.[6] .................................................. G08G 1/01
[52] U.S. Cl. ................... 340/933; 340/941; 340/938; 180/167; 180/168; 180/169; 318/587
[58] Field of Search ............................... 340/933, 941, 340/938, 988, 905; 180/167, 168, 169; 318/587; 364/424.02

[56] References Cited

U.S. PATENT DOCUMENTS

| | | | |
|---|---|---|---|
| 3,644,825 | 2/1972 | Davis | 340/941 |
| 3,745,450 | 7/1973 | Wilt | 340/941 |
| 3,757,887 | 9/1973 | Moore et al. | 180/168 |
| 3,768,586 | 10/1973 | Thompson et al. | 180/168 |
| 4,006,790 | 2/1977 | Kawano et al. | 180/168 |
| 4,043,418 | 8/1977 | Blaeslee | 180/168 |
| 4,176,728 | 12/1979 | Otteblad et al. | 180/168 |
| 4,302,746 | 11/1981 | Scarzello et al. | 340/941 |
| 4,307,329 | 12/1981 | Taylor | 318/587 |
| 4,315,242 | 2/1982 | Lueg et al. | 340/941 |
| 4,456,088 | 6/1984 | Nishiki et al. | 180/168 |
| 4,613,804 | 9/1986 | Swenson | 318/587 |
| 4,657,463 | 4/1987 | Pipes | 414/495 |
| 4,714,124 | 12/1987 | Laib | 180/168 |
| 4,742,283 | 5/1988 | Bolger et al. | 318/587 |
| 4,782,342 | 11/1988 | Walton | 340/941 |
| 4,791,570 | 12/1988 | Sherman et al. | 364/436 |
| 4,847,769 | 7/1989 | Reeve | 364/424.02 |
| 4,847,774 | 7/1989 | Tomikawa et al. | 364/449 |
| 4,864,207 | 9/1989 | Miura et al. | 318/587 |
| 4,902,948 | 2/1990 | Sherman et al. | 318/580 |
| 4,912,734 | 3/1990 | Frauenglass | 377/20 |
| 4,942,404 | 7/1990 | Kefer | 342/418 |
| 4,968,979 | 11/1990 | Mizuno et al. | 340/941 |
| 4,980,692 | 12/1990 | Rudish et al. | 343/700 MS |
| 4,998,219 | 3/1991 | Frauenglass | 364/715.06 |
| 5,008,571 | 4/1991 | Rudish | 307/529 |
| 5,041,722 | 8/1991 | Suzuki et al. | 250/202 |
| 5,059,927 | 10/1991 | Cohen | 331/77 |
| 5,109,940 | 5/1992 | Yardley | 180/168 |
| 5,113,363 | 5/1992 | Orsino et al. | 364/736 |
| 5,119,049 | 6/1992 | Heller et al. | 333/160 |
| 5,119,266 | 6/1992 | Petry | 361/111 |
| 5,127,486 | 7/1992 | Yardley et al. | 180/168 |

(List continued on next page.)

FOREIGN PATENT DOCUMENTS 549674   12/1942   United Kingdom .

Primary Examiner—Brent Swarthout
Assistant Examiner—Nina Tong
Attorney, Agent, or Firm—Dickinson, Wright, Moon, Van Dusen & Freeman

[57] ABSTRACT

Apparatus for determining the position of a mobile vehicle relative to a fixed location marker device which comprises a coil energized to emit a magnetic field composed of lines of magnetic flux extending radially and arcuately from the ends of the coil's longitudinal axis. A sensor unit mounted on the mobile vehicle comprises four identical sensing coils each responsive to the frequency of the magnetic field of the marker device and each having a major axis. These sensor coils are supported in two pairs with the major axes of the sensor coils of each pair disposed on either side of a common central plane and extending parallel thereto, this common central plane extending transversely to the longitudinal axis of the marker device coil. Each pair of sensor coils is arranged in an X pattern in which their major axes cross each other medially and perpendicularly to define a center for the coil pair. The two pairs of coils are mounted with their centers spaced apart a fixed distance on a base line which the major axes of the coils cross at a 45 degree angle. Position signals from the sensor coils are processed to produce X and Y coordinate values indicating the relative position of the sensor unit to the marker device. The marker device may be inductively excited from an antenna on the mobile vehicle.

19 Claims, 5 Drawing Sheets

U.S. PATENT DOCUMENTS

| | | | |
|---|---|---|---|
| 5,140,285 | 8/1992 | Cohen | 331/96 |
| 5,149,241 | 9/1992 | Haymore et al. | 414/279 |
| 5,149,242 | 9/1992 | Haymore | 414/279 |
| 5,154,248 | 10/1992 | Schwager et al. | 180/168 |
| 5,154,249 | 10/1992 | Yardley | 180/168 |
| 5,175,415 | 12/1992 | Guest | 235/95 R |
| 5,187,664 | 2/1993 | Yardley et al. | 364/424.02 |
| 5,191,528 | 3/1993 | Yardley et al. | 364/424.02 |
| 5,192,033 | 3/1993 | Pipes | 242/58.6 |
| 5,195,173 | 3/1993 | Gordon et al. | 395/60 |
| 5,202,644 | 4/1993 | Brady | 329/313 |
| 5,202,678 | 4/1993 | Taber et al. | 328/119 |
| 5,216,605 | 6/1993 | Yardley et al. | 364/424.02 |
| 5,331,276 | 7/1994 | Polvani et al. | 340/941 |

# VEHICLE POSITION DETERMINING APPARATUS

SUMMARY OF THE INVENTION

This invention relates to apparatus for determining the position of a mobile vehicle relative to a fixed location marker device. The location marker device comprises a coil which is energized to emit a magnetic field detected by a sensor unit mounted on the mobile vehicle and producing location information preferably in the form of X and Y coordinate value indicating the relative position of the marker device and sensing unit.

The location marker device may be a coil energized from an AC power source; alternatively, the location marker device may be a transponder which is an inert device having a coil that becomes energized when inductively excited by an AC magnetic field, usually from a transmitter on the mobile vehicle. Transponders are commercially available which in addition to emitting a magnetic field also produce an unique identification signal. Such devices will be referred to as coded transponders and can be optionally employed with the invention to determine the position of a mobile vehicle relative to a certain location. The term "mobile vehicle" as used herein means not only a vehicle itself—such as an Automatic Guided Vehicle (AGV); but also includes a movable device on such a vehicle, as for example, the forks on a fork lift truck or a movable coupler on a towing vehicle.

The present invention provides apparatus for determining the position of a mobile vehicle relative to a fixed location marker device wherein the location marker device includes a coil having a central longitudinal axis, exciter means for causing the coil to emit a magnetic field of a certain frequency and composed of lines of magnetic flux extending radially and arcuately from the ends of the longitudinal axis of the coil. The apparatus includes a sensor unit mounted on the mobile vehicle. This sensor unit comprises four identical sensing coils each responsive to the frequency of said magnetic field, and each having a major axis. The sensor unit includes means for supporting the sensing coils in two pairs with their major axes disposed in two parallel planes positioned on said mobile vehicle so as to extend transversely to the longitudinal axis of the marker device coil, the major axis of one sensing coil of each pair lying in one of the two planes and the major axis of the other sensing coil of each pair lying in the other of the two planes. The major axes of the sensing coils of each pair are arranged in a X pattern in which the major axis of one coil of each pair extends perpendicularly to the major axis of the other sensing coil of each pair, and in which the major axes of each pair cross medially of the length thereof to define a center for each pair of sensing coils. These centers of the pairs of sensing coils are spaced apart by a fixed reference distance along a base line which is crossed by the major axis of each sensing coil of each pair at an angle of 45 degrees. Circuit means obtains a position signal from each of the sensing coils in response to the passage thereof through the magnetic field of the location marker device and means compute from said position signals and from the angular relations between said sensing coils Y and X coordinate values indicative of the position of the sensing unit relative to said location marker device.

Preferably, the pairs of sensing coils are mounted on a panel having oppositely facing substantially parallel surfaces, one sensing coil of each of said two pairs being positioned on one of said parallel surfaces, and the other sensing coil of each of said two pairs being positioned on the other of said parallel surfaces. This panel may be formed by a circuit board on which at least a part of the circuit means for obtaining position signals from each of said sensing coils are mounted.

When the location marker device comprises a transponder, exciter means therefor is carried by the mobile vehicle and includes an antenna for transmitting a frequency signal adapted to inductively excite the coil of said transponder. The antenna preferably is formed on the circuit board and consists of a continuous loop surrounding the pairs of sensor coils.

In a case in which the apparatus of the invention is employed to detect the position of a mobile vehicle itself, the parallel planes in which the major axes of the sensor coils lie are preferably positioned perpendicularity to the longitudinal axis of the location marker device.

The foregoing and other features of the invention will become more apparent from the description to follow of the presently preferred embodiments thereof shown in the accompanying drawings.

DESCRIPTION OF THE PREFERRED EMBODIMENTS

Figure 1:
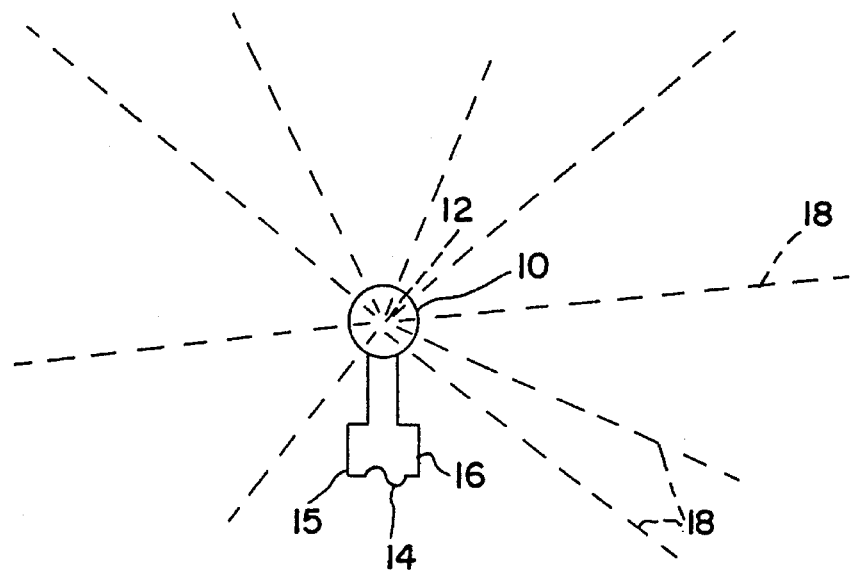
FIG. 1 is a plan view of the coil of a location marker device, schematically illustrating the pattern of the magnetic field emitted thereby.

FIG. 1 shows a location marker device 10 consisting of a coil having a longitudinal axis 12 extending perpendicular to the plane of the view. When excited by an AC power source 14 connected to the coil through leads 15 and 16, the coil emits a magnetic field formed by lines of magnetic flux 18 extending radially and arcuately outwardly from the end of the longitudinal axis 12. The arcuate pattern of these lines of flux is further illustrated by FIG. 2. Only a few of these lines of flux are shown in FIG. 1. Actually, these lines of magnetic flux are countless in number and when viewed from the top, as in FIG. 1, form a magnetic field having the shape of a donut of indefinite size and a center of zero diameter.

Figure 2:
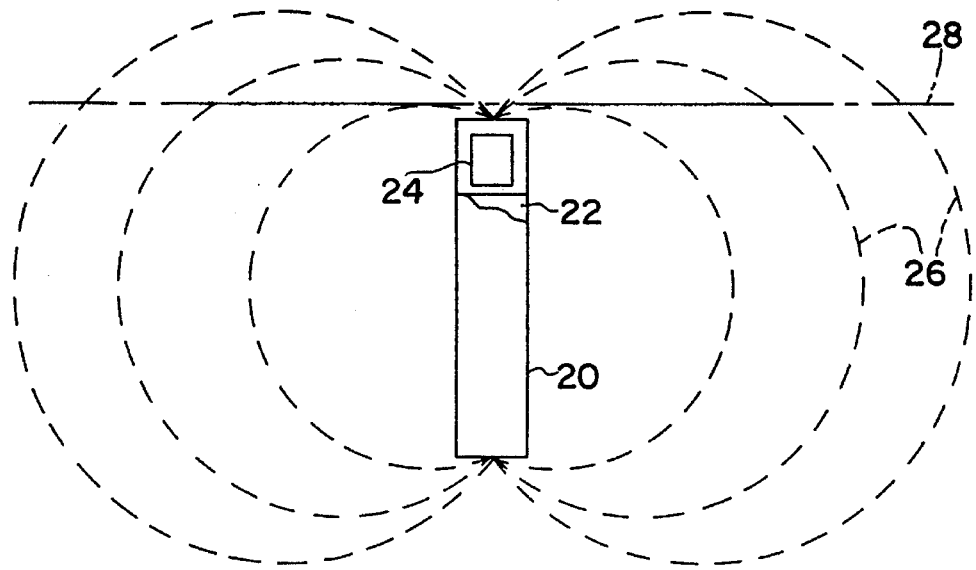
FIG. 2 is a side elevation of a location marker device in the form of a transponder, schematically illustrating the pattern of the magnetic field emitted by the coil thereof.

An alternative form of location marker device 20 shown in FIG. 2, consists of a transponder having a coil 22 and optionally including a micro circuit 24 for regulating the output of the coil 22. Normally, a transponder is inert unit. When the coil 22 is inductively excited by an external source of suitable frequency, a magnetic field is emitted and is formed by lines of flux 26 extending from the opposite ends of the coil 22. The micro circuit 24 is incorporated in transponders of the coded type and causes an unique information signal to be transmitted at least periodically. Such coded transponders are available commercially, for example the TELSOR, Model 1787, a product of Telsor Corporation. The location marker device 10 or 20, when employed in a vehicle navigation system, is normally mounted with its longitudinal axis extending perpendicular to a surface 28 (FIG. 2) over which the vehicle travels.

Figure 3:
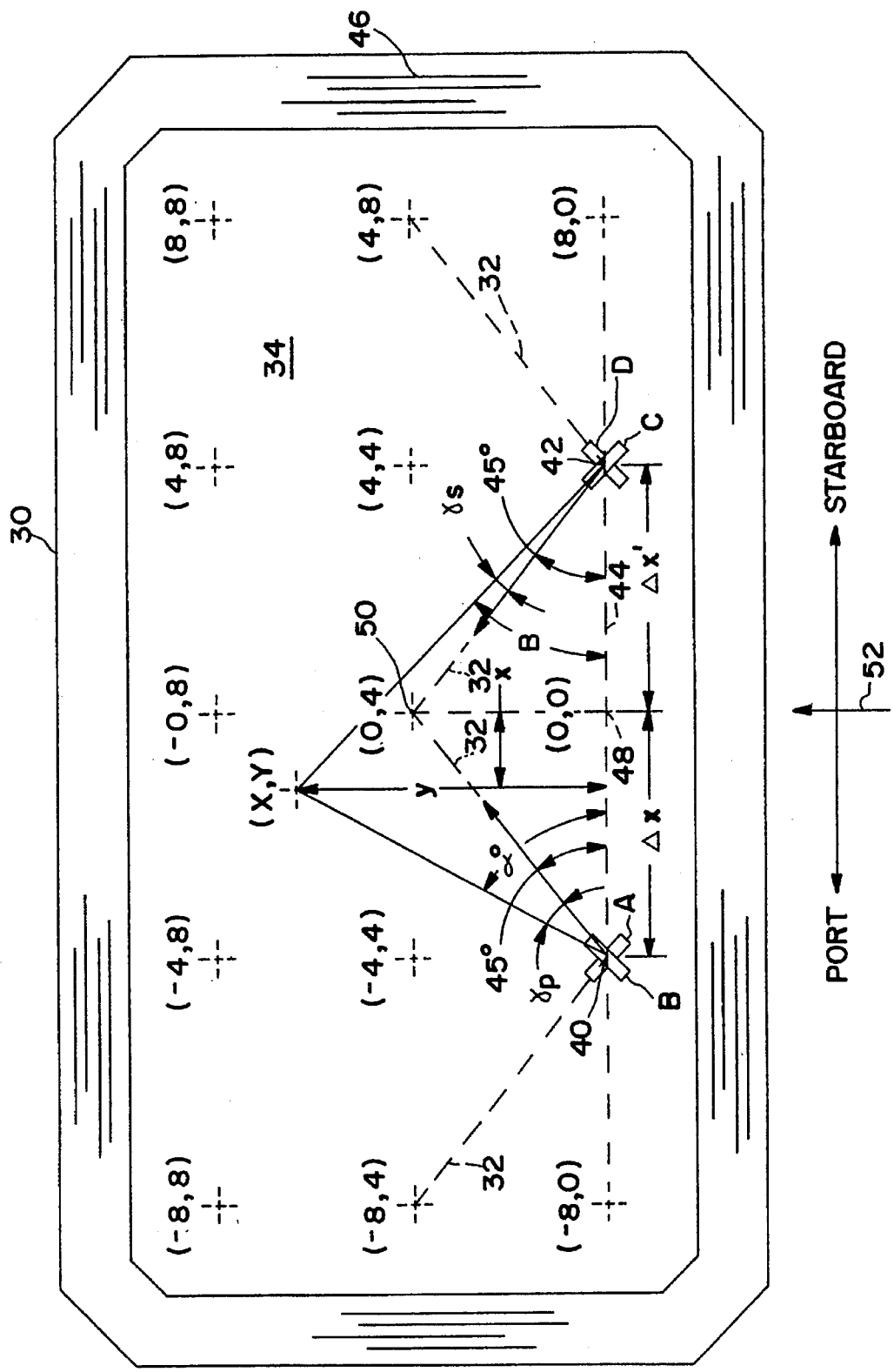
FIG. 3 is a plan view of a sensing unit of the invention, schematically illustrating the sensing coils, the angular relations therebetween, and a particular relation between the magnetic field of a location marker device and the sensing unit.
Figure 4:
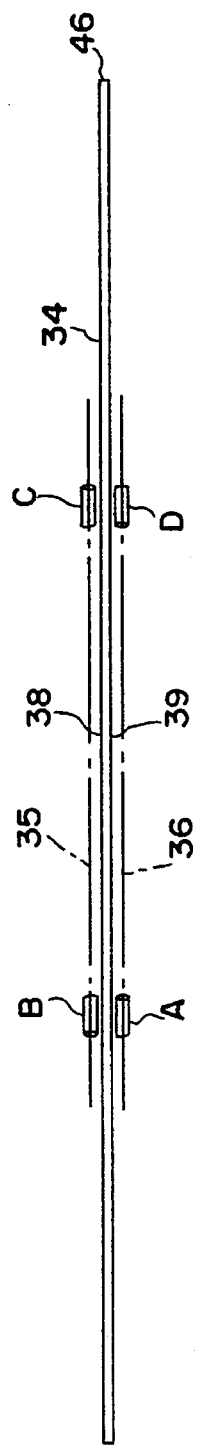
FIG. 4 is a side elevation of the sensing unit of FIG. 3.

A sensing unit 30 of the invention is illustrated in FIGS. 3 and 4. This sensing unit 30 comprises four identical sensing coils A–D each responsive to the frequency of the magnetic field of the marker device, and each having a major axis 32. These sensor coils are supported on a panel 34, preferably formed by a circuit board, in two pairs A and B and C and D. The major axes 32 of the sensor coils A–D are disposed in two parallel planes 35 and 36 (FIG. 4) which extend transversely to the longitudinal axis of the marker device when the sensor unit is mounted on a mobile vehicle. The major axis of each of the coils A and D lies in one of these two parallel planes and the major axis of each of the coils B and C lies in the other of the two parallel planes. In the construction shown in FIGS. 3 and 4, the panel 34 has oppositely facing substantially parallel surfaces 38 and 39, coils B and C being mounted on one of these surfaces 38 and the coils A and D being mounted on the other of these surfaces, 39.

The major axes of the sensing coils A–B and C–D of each pair are arranged in a X pattern in which the major axis of one coil of each pair extends perpendicularly to the major axis of the other coil of each pair. Also, the major axes of the coils A and B cross each other medially of the length thereof to define a center 40 for the pair of sensing coils A and B. Similarly, the major axis of the coil C crosses the major axis of the coil D medially of the length thereof to define a center 42 for the pair of coils C and D. The centers 40 and 42 of the pairs of coils are spaced apart a fixed distance along a base line 44 which is crossed by the major axis of each of the sensing coils at an angle of 45 degrees.

When a marker device in the form of a transponder 20 is used, exciter energy is required in order for the transponder 20 to transmit its signal. This energy is preferably supplied from an antenna 46 or exciter loop formed on the circuit board panel 34. The antenna 46 is thus substantially coplanar with the major axes of the sensor coils A–D and the lines of energy generated by the antenna are primarily perpendicular to the plane of the panel 34. The antenna loop surrounds the sensor coils A–D, and since the plane of the circuit board panel 34 extends transversely to the major axis of the transponder coil, the transponder can be activated within the sensing area of the sensing unit.

To further illustrate and explain the invention, the panel 34 of FIG. 3 has been defined in rectangular coordinates based on a selected sensing area of 8"×16". The midpoint 48 of the base line 44 distance between the centers 40 and 42 of the two pairs of coils (which in this example represents a distance of 8") is the zero point of the X coordinate. Located vertically above this point 48 is a locus 50 defined by the intersection between the major axes of the coils B and C, and this locus 50 represents the 4" point on the Y axis of the coordinates. A maximum signal will be received by any one of the sensing coils A–D from a magnetic source directly in line with the major axis of the coil. Likewise a minimum signal will be received from a magnetic source perpendicular to the major axis of the coil.

In order to keep the signals from the four coils and their signs separate, the "forward" direction for each coil is defined as inline with the major axis of the core and into the desired sensing area of the panel 34. This forward direction is represented by the arrow 52 in FIG. 3. Any signal received from a source in front of coil A and to the left (port) of coil B defines the sign of the coil A signal as negative. Likewise any signal from a source in front of coil D and to the right (starboard) of coil C defines the sign of the D signal as negative. The sign of a signal from coil B is positive if the signal source is in front of B and to the right (starboard) of coil A. The sign of a signal from coil C is positive if the source is in front of coil C and to the left (port) of coil D.

Figure 3A:
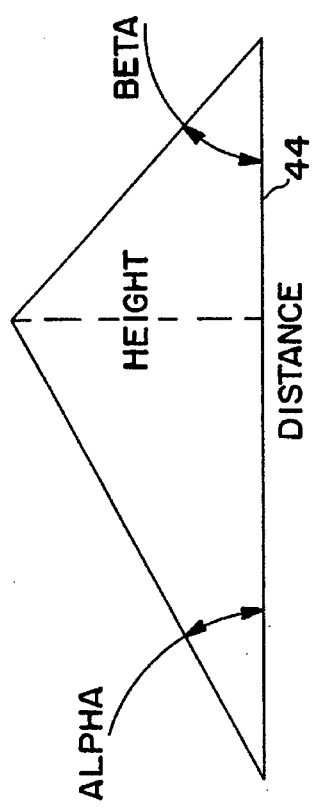
FIG. 3A is a triangle which will be used to explain the mathematical relationships between the sensing coils and the magnetic field of a marker device.

Based on the magnitude and the sign of these four coil signals A, B, C, and D and two trigonometric identities, the "X" displacement (plus or minus 8") and the "Y" displacement (0 to 8") can be calculated as explained below with reference to FIG. 3A. The triangle shown therein has a base distance which is equal to the distance between the centers 40 and 42 of the pairs of coils A–B and C–D. In other words, this line marked "distance" is the same as the base line 44 in FIG. 3.

The first trigonometric identity used states that the height of a triangle can be found from the dimension of its base and its two base angles as:

$$\text{Height} = \frac{\text{Distance}}{\text{COT(Alpha)} + \text{COT(Beta)}}$$

Assume that the height of the triangle represents the desired Y displacement and its base is the known 8 inch distance between the pairs of sensing coils. The Y displacement can be calculated if the two base angles Alpha and Beta are known. In this problem however, these angles are each a combination of two angles, namely, as shown by FIG. 3:

Alpha=45 degrees+GammaPort

Beta=45 degrees+GammaStbd

From the output (A, B, C or D) of the two pairs of sensing coils it is known that:

COT(GammaPort)=B/–A

COT(GammaStbd)=C/–D

The second trigonometric identity used state that:

$$\text{COT(45-angle)} = \frac{\text{COT(angle)} + 1}{\text{COT(angle)} - 1}$$

This identity will give the desired COT of Alpha and Beta in terms of the COT of GammaPort and GammaStbd if the negative values of these angles are used.

COT(-GammaPort)=B/A

COT(-GammaStbd)=C/D

Then:

$$\text{COT(Alpha)} = \text{COT}(45 - (-\text{GammaPort})) =$$

$$\frac{\text{COT(-GammaPort)} + 1}{\text{COT(-GammaPort)} - 1} = \frac{(B/A) + 1}{(B/A) - 1} =$$

-continued $$\frac{(B+A)/A}{(B-A)/A} = \frac{B+A}{B-A}$$

And:

COT(Beta) = COT(45 − (−GammaStbd)) =

$$\frac{COT(-\text{GammaStbd}) + 1}{COT(-\text{GammaStbd}) - 1} = \frac{(C/D) + 1}{(C/D) - 1} =$$

$$\frac{(C+D)/D}{(C-D)/D} = \frac{C+D}{C-D}$$

Therefore:

$$Y = \frac{\text{Distance}}{\text{COT(Alpha)} + \text{COT(Beta)}} = \frac{8 \text{ inches}}{\frac{B+A}{B-A} + \frac{C+D}{C-D}}$$

Since the distance of the triangle's base is in inches and the outputs of the sensing coils are dimensionless, the resulting Y value is also in inches.

Once Y is known, the value X can be calculated as follows:

COT(Alpha)=Delta_X/Y where (from FIG. 3):

X=Delta X−4 or Delta X=X+4

Also:

COT(Beta)=Delta_X'/Y where (from FIG. 3):

X=4−Delta X' or Delta X'+4−X

By substitution:

Y·COT(Alpha)=X+4 or X=(Y·COT(Alpha))−4

Y·COT(Beta)=4−X or X=4−(Y·COT(Beta))

To improve accuracy as either Alpha or Beta become very small, the Alpha and Beta equations are added and the result divided by two to solve for X.

2·X=(Y·COT(Alpha))−4+4−(Y·COT(Beta))

X=(Y/2)·(COT(Alpha)−COT(Beta))

Therefore:

$$X = \frac{Y}{2} \cdot \left( \frac{B+A}{B-A} - \frac{C+D}{C-D} \right)$$

Figure 5:
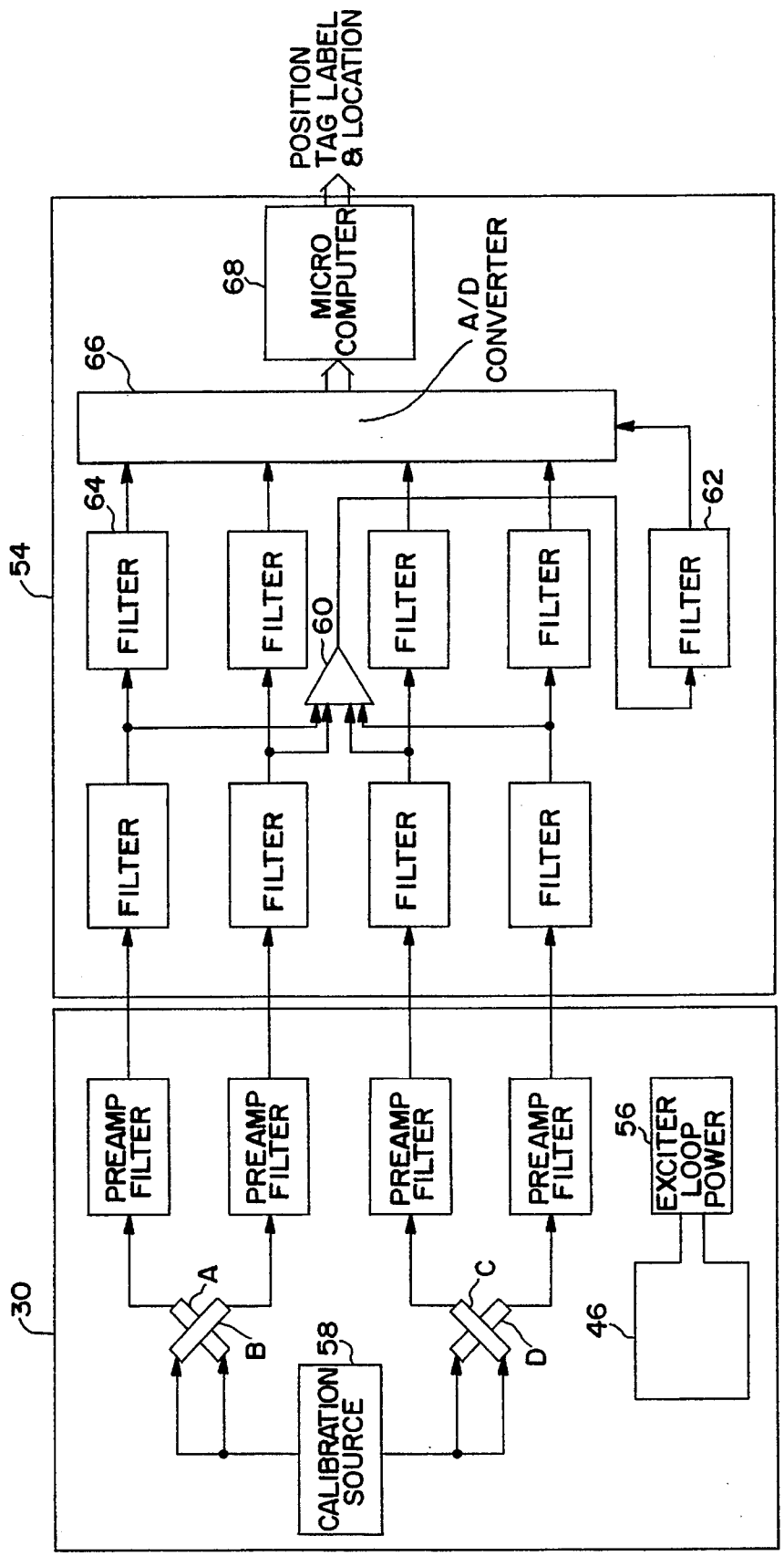
FIG. 5 is a schematic diagram illustrating circuit elements employed with the sensor unit of the invention.

FIG. 5 schematically illustrates circuit means for obtaining a position signal from each of the sensing coils A–D in response to the passage thereof through the magnetic field of a marker device. Since the magnetic field sensed by the coils A–D is very small when compared to the exciter field, filters and amplifiers are mounted on the sensor circuit board 34 to improve the coil signals before they are sent to a signal processing circuit board 54. An antenna loop power source 56 and calibration circuits 58 are also mounted on the sensor circuit board 34. The four signals from the coils A–D pass through additional filters on the signal processing board 54. In a case where the marker device is a coded transponder, the four signals from the coils A–D are then summed together at the amplifier 60 to create a fifth signal which is used to extract the transponder's unique identification code. This signal is then passed through a wide band filter 62 to preserve the frequency code information. The four signals from the coils A–D are passed through four independent narrow band filters 64 to preserve only the position information from the marker device. The four position signals are then synchronously detected by means of a four channel analog to digital convertor 66. The fifth signal is used as a phase reference for the convertor 66. This process captures both the amplitude and the sign of the four position signals.

A coded transponder 20 is programmed to transmit a single frequency following the frequency code. This single frequency is maintained for a short time before the code is again transmitted. The single frequency allows accurate measurement of the four position signals. A micro computer 66 mounted on the signal processing board 54 first decodes the transponder code before measuring the four position signals. To improve accuracy, multiple measurements of the position signals are averaged together during a single frequency time period. The micro computer 66 then determines the location of the transponder 20 by means of the mathematical triangulation explained above. The micro computer 66 then sends the transponder code and the location in X, Y coordinates to a navigation computer, or other device for use in accordance with the nature of the mobile vehicle and the elements thereof to be controlled.

Figure 6:
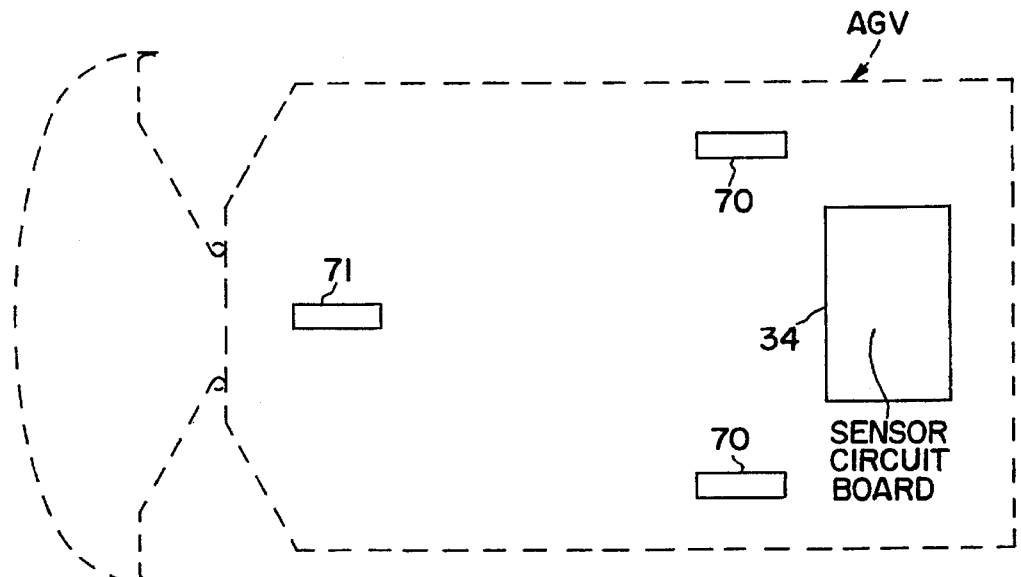
FIG. 6 is a plan view schematically illustrating the sensor unit of the invention mounted on a mobile vehicle, such as an AGV; and, FIG. 7 is a side elevation illustrating the sensing unit of the invention combined with other components for controlling the movement of an AGV.
Figure 7:
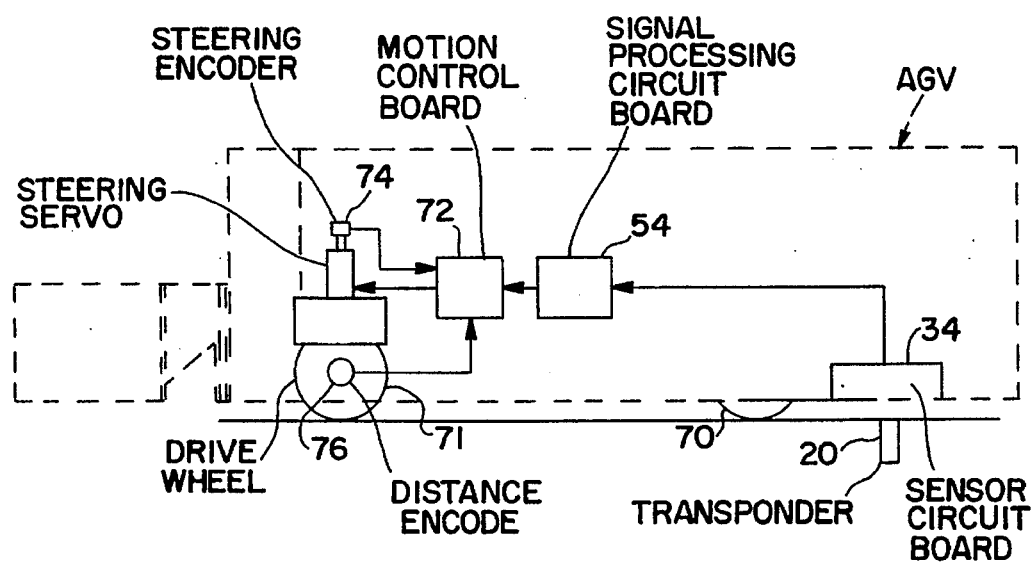

FIGS. 6 and 7 illustrate the application of the invention to the control of an AGV. In FIG. 6, the sensor circuit board 34 is shown installed behind the rear wheels 70 of a three wheeled AGV having a front steerable wheel 71. A side elevation of the AGV is shown in FIG. 7. The sensor circuit board 34 is connected to the signal processing circuit board 54 and the output of the micro computer 68 thereof is applied to a motion control board 72. This motion control board 72 also receives input signals from a steering encoder 74, which gives the angular position of the steerable wheel 71, and from a distance encoder 76 which gives the distance travelled by the vehicle from a starting point. When the sensor circuit board 34 passes near a transponder 20, the resulting signals from the sensor coils A–D are processed and averaged in the signal processing circuit board 54. In this application of the invention, output signals are usually determined when the value of the Y coordinate signal is approximately 4", as this indicates when the geometric center, or the locus 50, of the sensor circuit board 34 is closest to the longitudinal axis of the transponder 20. The resulting X and Y coordinate values are supplied to the motion control board 72 which determines any appropriate course correction for the AGV and supplies this information to the steering mechanism.

In other applications of the invention, the X and Y coordinate values may be employed to control separate elements on the mobile vehicle. For example, if it is desired to employ the invention for positioning a fork lift truck relative to a load or pallet equipped with a transponder, the value of the X coordinate output signal can be employed to steer or align the vehicle relative to the load. The Y coordinate signal can be employed to align the forks vertically into a desired position for picking up the load.

Other possible uses of the invention will be apparent to those skilled in the art.

We claim:

1. An apparatus for determining the position of a mobile vehicle relative to a fixed location marker device wherein:

said location marker device includes a coil having a central longitudinal axis, exciter means for causing said coil to emit a magnetic field of a certain frequency and composed of lines of magnetic flux extending radially and arcuately outwardly from the ends of said longitudinal axis;

said apparatus including a sensor unit mounted on said mobile vehicle, said sensor unit comprising four identical sensor coils each responsive to the frequency of said magnetic field, and each having a major axis;

said sensor unit including means for supporting said sensor coils in two pairs with their major axes disposed in two parallel planes positioned on said mobile vehicle so as to extend transversely to said longitudinal axis of said marker device, the major axis of one sensor coil of each pair lying in one of said two planes and the major axis of the other sensor coil of each pair lying in the other of said two planes, the major axes of the sensor coils of each pair being arranged in an X pattern in which the major axis of one coil of each pair extends perpendicularly to the major axis of the other coil of each pair, and in which said major axes of each pair cross medially of the length thereof to define a center for each pair of said sensor coils, said centers of said pairs of sensor coils being spaced apart by a fixed reference distance along a base line, said base line being crossed by the major axis of each of said sensor coils at an angle of 45 degrees;

circuit means for obtaining a position signal from each of said sensor coils in response to the passage thereof through said magnetic field;

and means for computing from said position signals and from the angular relations between said sensor coils which include Y and X coordinate values indicative of the position of said sensor unit relative to said location marker device.

2. An apparatus according to claim 1 wherein said two parallel planes extend perpendicularly to said longitudinal axis of said marker device.

3. An apparatus according to claim 1 wherein said exciter means comprises a source of alternating current connected to said coil of said location marker device.

4. An apparatus according to claim 1 wherein said means for supporting said sensor coils comprises a panel having oppositely facing substantially parallel surfaces, one sensor coil of each of said two pairs being positioned on one of said parallel surfaces, and the other sensor coil of each of said two pairs being positioned on the other of said parallel surfaces.

5. An apparatus according to claim 4 wherein said panel is formed by a circuit board.

6. An apparatus according to claim 5 wherein said circuit means is composed at least in part of circuit elements on said circuit board.

7. An apparatus according to claim 5 wherein said centers of said pairs of sensor coils are located on said circuit board.

8. An apparatus according to claim 1 wherein said exciter means is carried by said mobile vehicle and includes antenna means for transmitting a frequency adapted to inductively excite said coil of said location marker device.

9. An apparatus according to claim 8 wherein said means for supporting said sensor coils comprises a panel having oppositely facing substantially parallel surfaces, one sensor coil of each of said two pairs being positioned on one of said parallel surfaces, and the other sensor coil of each of said two pairs being positioned on the other of said parallel surfaces.

10. An apparatus according to claim 9 wherein said antenna means is carried by said panel and is formed by an antenna loop surrounding said pairs of sensor coils.

11. An apparatus according to claim 10 wherein said panel is formed by a circuit board.

12. An apparatus according to claim 11 wherein said antenna is formed on said circuit board.

13. An apparatus according to claim 12 wherein said antenna surrounds said pairs of sensor coils.

14. An apparatus according to claim 13 wherein said circuit means includes filter and amplifier elements for enhancing the signal from each of said sensor coils, means for converting each of said enhanced signals from analog to digital form, and said means for computing includes a microprocessor supplied with said converted signals.

15. A sensor unit adapted to be mounted on a mobile vehicle for detecting the position of said vehicle relative to a fixed location marker, said sensor unit comprising two pairs of sensor coils, each of said sensor coils having a longitudinal axis, each of said pairs of sensor coils being arranged in an X pattern in which their longitudinal axes cross each other medially and perpendicularly to define a center for each of said pairs of sensor coils, means for mounting said pairs of sensor coils with their said centers spaced apart a fixed reference distance along a base line which said longitudinal axis of each of said sensor coils cross at an angle of 45 degrees; and with said longitudinal axes of the sensor coils of each of said pairs positioned on opposite sides of and extending parallel to a common central plane;

circuit means connected to each of said sensor coils for obtaining a position signal therefrom; and means for obtaining from said position signals and said fixed reference distance including Y and X coordinate values indicative of the position of said mobile vehicle.

16. A sensor unit according to claim 15 wherein said common central plane is formed by a circuit board.

17. A sensor unit according to claim 16 wherein said circuit means are provided at least in part on said circuit board.

18. A sensor unit according to claim 17 wherein said circuit board is provided with an antenna.

19. A sensor unit according to claim 18 wherein said antenna surrounds said pairs of sensor coils and is located substantially in said common plane.

* * * * *